US012808978B2

(12) United States Patent
Paltin et al.

(10) Patent No.: US 12,808,978 B2
(45) Date of Patent: Nov. 24, 2026

(54) POSITIONING CORRECTION BY CENTRALIZED MODEL FOR MULTIPLE-ROUND TRIP TIME-BASED USER EQUIPMENT LOCATION ESTIMATION

(71) Applicant: Dell Products L.P., Round Rock, TX (US)

(72) Inventors: Evgeny Paltin, Montreal (CA); Gwenael Poitau, Montreal (CA); Hamidreza Farmanbar, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 516 days.

(21) Appl. No.: 18/340,992

(22) Filed: Jun. 26, 2023

(65) Prior Publication Data

US 2024/0426975 A1 Dec. 26, 2024

(51) Int. Cl.
*G01S 7/295* (2006.01)
*G01S 13/76* (2006.01)

(52) U.S. Cl.
CPC .............. *G01S 7/295* (2013.01); *G01S 13/76* (2013.01)

(58) Field of Classification Search
CPC ........ G01S 7/295; G01S 13/76; G01S 5/0205; G01S 5/0273; G01S 5/0278;
(Continued)

(56) References Cited

U.S. PATENT DOCUMENTS 10,908,299 B1 * 2/2021 Tadayon ............... G01S 5/0027
12,484,012 B2 * 11/2025 Zohoorian ............ H04W 64/00
(Continued)

FOREIGN PATENT DOCUMENTS

KR 20230040117 A * 3/2023 ........... G01S 5/0278
WO WO-2024065768 A1 * 4/2024 ........... G01S 5/0278

OTHER PUBLICATIONS

Communication Pursuant to Rules 161(1) and 162 EPC received for EP Patent Application Serial No. 23813931.5 dated Feb. 3, 2026, 3 pages.
International Preliminary Report on Patentability received for PCT Application Serial No. PCT/US2023/036205 dated Jan. 8, 2026, 8 pages.
International Search Report and Written Opinion for PCT Application No. PCT/US2023/036205 mailed Apr. 16, 2024, 13 pages.
(Continued)

*Primary Examiner* — Resha Desai
*Assistant Examiner* — Remash R Guyah
(74) *Attorney, Agent, or Firm* — Amin, Turocy & Watson, LLP

(57) ABSTRACT

The technology described herein is directed towards training an AI/ML (artificial intelligence/machine learning) correction model for round trip time data that captures various properties of a planned deployment of transmit-receive points. The model is trained on round-trip time measurements of communications between training device instances and transmit-receive points in an actual or simulated deployment environment. Once trained, non-line of sight round trip data is corrected by the model into virtual line of sight round trip data. In inference, a modified vector dataset of measured line of sight round trip data and virtual non-line of sight round trip data is obtained from the trained model for communications between an unknown location of a user equipment in the environment and the transmit-receive points. The modified vector dataset is processed by a line of sight-based position determination/calculation function into an estimated location of the user equipment.

20 Claims, 12 Drawing Sheets

(58) Field of Classification Search
CPC ........ G01S 13/878; G01S 5/14; G01S 13/765; G01S 5/021; G01S 19/47; G01S 19/41; G01S 19/40; G01S 2205/008; G01S 5/0027; G01S 5/0054; G01S 5/014; G01S 5/0294; G01S 1/024; G01S 1/026; G01S 5/06; G01S 5/10; G01S 5/02216; G01S 5/0236; G01S 5/0018; H04W 56/006; H04W 4/02; H04W 4/023; H04W 4/025; H04W 4/027; H04W 64/00; H04W 84/005; H04W 4/026; H04W 4/029; H04W 56/005; H04W 24/10; H04W 56/001; H04W 56/007; H04W 64/003; H04W 64/006; H04W 72/23; H04W 88/02; H04W 12/03; H04W 12/04; H04W 24/08; H04W 48/10; H04L 43/0864; H04L 43/0888; H04L 47/283; H04L 2101/622; G06F 18/2155; G06N 3/0442; G06N 3/045; G06N 3/0464; G06N 3/08; G06N 20/00
USPC .......................................................... 370/252
See application file for complete search history.

(56) References Cited

U.S. PATENT DOCUMENTS

| | | | | |
|---|---|---|---|---|
| 2010/0190509 | A1* | 7/2010 | Davis .................. | H04W 56/006<br>455/456.1 |
| 2013/0045755 | A1* | 2/2013 | Davis .................. | H04W 56/006<br>455/456.1 |
| 2016/0057577 | A1 | 2/2016 | Venkatraman et al. | |
| 2016/0323753 | A1* | 11/2016 | Zhang ................... | H04W 16/20 |
| 2017/0091008 | A1* | 3/2017 | Cherbakov ......... | G06F 11/0709 |
| 2021/0006579 | A1* | 1/2021 | Correa Bahnsen ... | H04L 41/142 |
| 2022/0053436 | A1 | 2/2022 | Sosnin et al. | |
| 2023/0354254 | A1* | 11/2023 | Sundararajan ........ | G01S 5/0244 |

OTHER PUBLICATIONS

3GPP, "5G; NG Radio Access Network (NG-RAN); Stage 2 functional specification of User Equipment (UE) positioning in NG-RAN (3GPP TS 38.305 version 15.4.0 Release 15)," ETSI TS 138 305 V15.4.0 (Jul. 2019).

* cited by examiner

POSITIONING CORRECTION BY CENTRALIZED MODEL FOR MULTIPLE-ROUND TRIP TIME-BASED USER EQUIPMENT LOCATION ESTIMATION

BACKGROUND

In new radio (NR), the third generation partnership project (3GPP) standard facilitates the collection of measurements needed to implement a multiple point round trip time positioning algorithm to determine the location of a user equipment (UE). This algorithm has a significant drawback, mainly because of its reliance on line-of-sight conditions between multiple transmit-receive points and a user equipment (UE). Even when most of the links between the transmit-receive points and a UE are line-of-sight links, even a single non-line of sight link can cause outsized degradation of the position determination.

Another approach to determining a UE's position is a channel impulse response (CIR)-based direct AI/ML (artificial intelligence/machine learning) approach, which avoids the line-of-sight dependency by having an AI/ML model find a relationship between CIR data and a position coordinate; (this approach is called 'Direct' because it maps directly between the CIR and location coordinates without trying to model the process). However, the CIR-based direct AI/ML approach is very impractical in most scenarios because of being sensitive to the slightest variations manifested in the perceived CIR. More particularly, one of the most significant CIR-related variations is a clock instability, which can correspond to loose timing synchronization between transmit-receive points. When a clock drifts, the perceived time of arrival is incorrect and channel taps phase rotate, resulting in incorrect CIR data. CIR-based direct AI/ML algorithms thus require very tight network synchronization. One solution attempts to include virtually all of the targeted conditions in the training dataset; for clock-related issues, this means attempting to generate a training dataset with virtually all possible variations of clock behaviors among multiple transmit-receive points and a UE. Such a solution is not practical for real system deployments.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
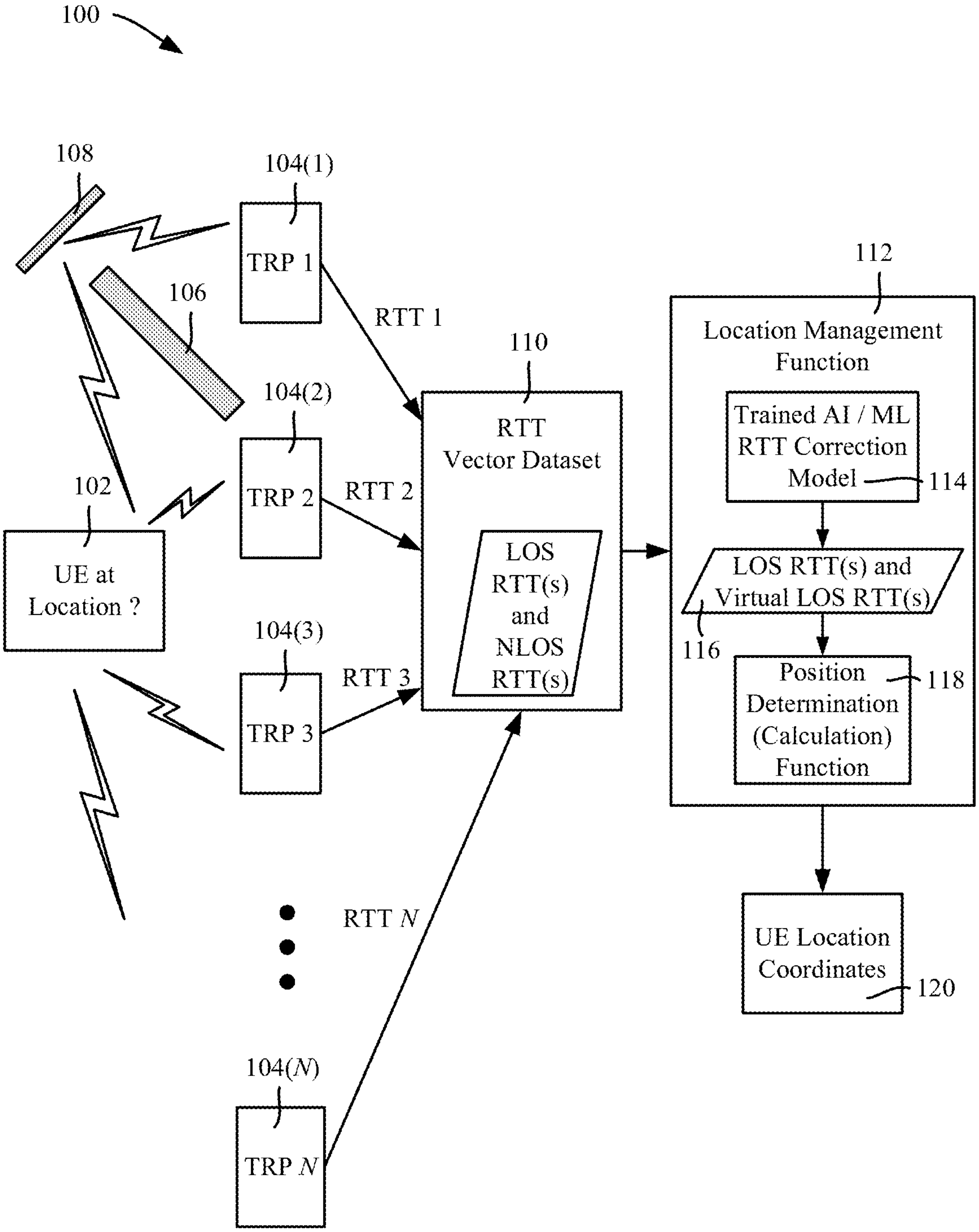
FIG. 1 depicts an example block diagram representation of a system/architecture in which an artificial intelligence/machine learning (AI/ML) model corrects round trip time data for non-line of sight communications, for estimation of a location of a user equipment, in accordance with various aspects and implementations of the subject disclosure.

Various aspects of the technology described herein are generally directed towards having a centralized trained artificial intelligence/machine learning (AI/ML) model obtain a dataset of round-trip time data, measured between transmit-receive points and user equipment at an unknown location, including for combinations of line of sight (LOS) and non-line of sight communication links, to obtain an estimated location of the user equipment (e.g., as location coordinates [x, y] or [x, y, z]). Significantly, given combinations of line of sight and non-line of sight communication links, the trained model can correct/modify any non-line of sight round trip time data into virtual "LOS-like" round trip time data. With the measured line of sight round trip time data and virtual round trip time data, a line of sight-based position determination (calculation) function, such as one of those already defined, can then estimate the location of the user equipment to a sufficient estimation accuracy.

Training is based on labeled training data corresponding to communications between a group of transmit-receive points and a number of device training instances (e.g., a device group) at known locations, with measured round trip time data obtained via the communications between the transmit-receive points and the device training instances. That is, each training label for each transmit-receive point can include a determined line of sight round trip time value based on the training device instance location (e.g., training device coordinates), and the actual, measured round trip time taken for communications to and from the device training instance location and the transmit-receive point.

As is understood, the round trip time for a non-line of sight communication is longer than the round trip time a line of sight communication. However, because each training device instance location is known, for non-line of sight communication links the model learns how to correct non-line of sight round trip times into virtual round trip times, e.g., based on the time difference between a measured round trip time and what the expected round trip time is determined to be had there been a line of sight communication link.

In this way, for user equipment at an unknown location, once trained the model can obtain and correct non-line of sight round trip time data into virtual "LOS-like" round trip time data. A vector dataset of the model's post-modified corrected non-line of sight round trip time value(s), along with (generally unmodified) measured round trip time line of sight value(s) can be input into the position determination function as if all values were measured line of sight round trip times, to obtain an estimated location of the user equipment.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 is an example representation of a system/architecture 100 in which user equipment 102 at an unknown location communicates with a number of transmit-receive points (TRPs) 104(1)-104(N) deployed in an environment. This results in a number of round trip times RTT1-RTTN being determined by the transmit-receive points 104(1)-104(N), as further described in FIGS. 2 and 3B. As can be seen, at least RTT1 does not correspond to a line of sight measurement, as any direct communication link between the user equipment 102 and the transmit-receive points 104(1) (TRP 1) is blocked by an obstacle 106, whereby the measurement communication link is indirect, obtained as non-line of sight data off of some reflective surface 108. There may be any practical number of line of sight and non-line of sight round trip times in a given deployment.

In general, the transmit-receive points 104(1)-104(N) along with their multiple respective measured round trip times are combined into a round trip time (RTT) vector dataset 110, including line of sight (LOS) RTT(s) and non-line of sight (NLOS) RTT(s), which is input into a location management function 112. As set forth therein, the non-line of sight round trip time data in the vector dataset 110 are corrected by a trained AI/ML round trip time (RTT) correction model 114 (e.g., which can be external to or as in this example, incorporated into the location management function 112) to provide a modified vector dataset 116 of line of sight round trip time data RTT(s) and virtual line of sight round trip time data ("LOS-like") RTT(s). Once the non-line of sight round trip time data is corrected by the model 114 into the virtual line of sight round trip time data 116, the modified vector dataset 116 is input to a position determination (calculation) function 118, which is configured to process line-of-sight round trip time data into an estimated location (e.g., UE coordinates 120) of the user equipment 102. As can be readily appreciated, the amount of training data along with the fidelity of the training data (e.g., how accurate are the training devices' locations and measured round trip times) determine the correction accuracy and thus how closely the UE's estimated location coordinates are to the UE's actual location.

Figure 2:
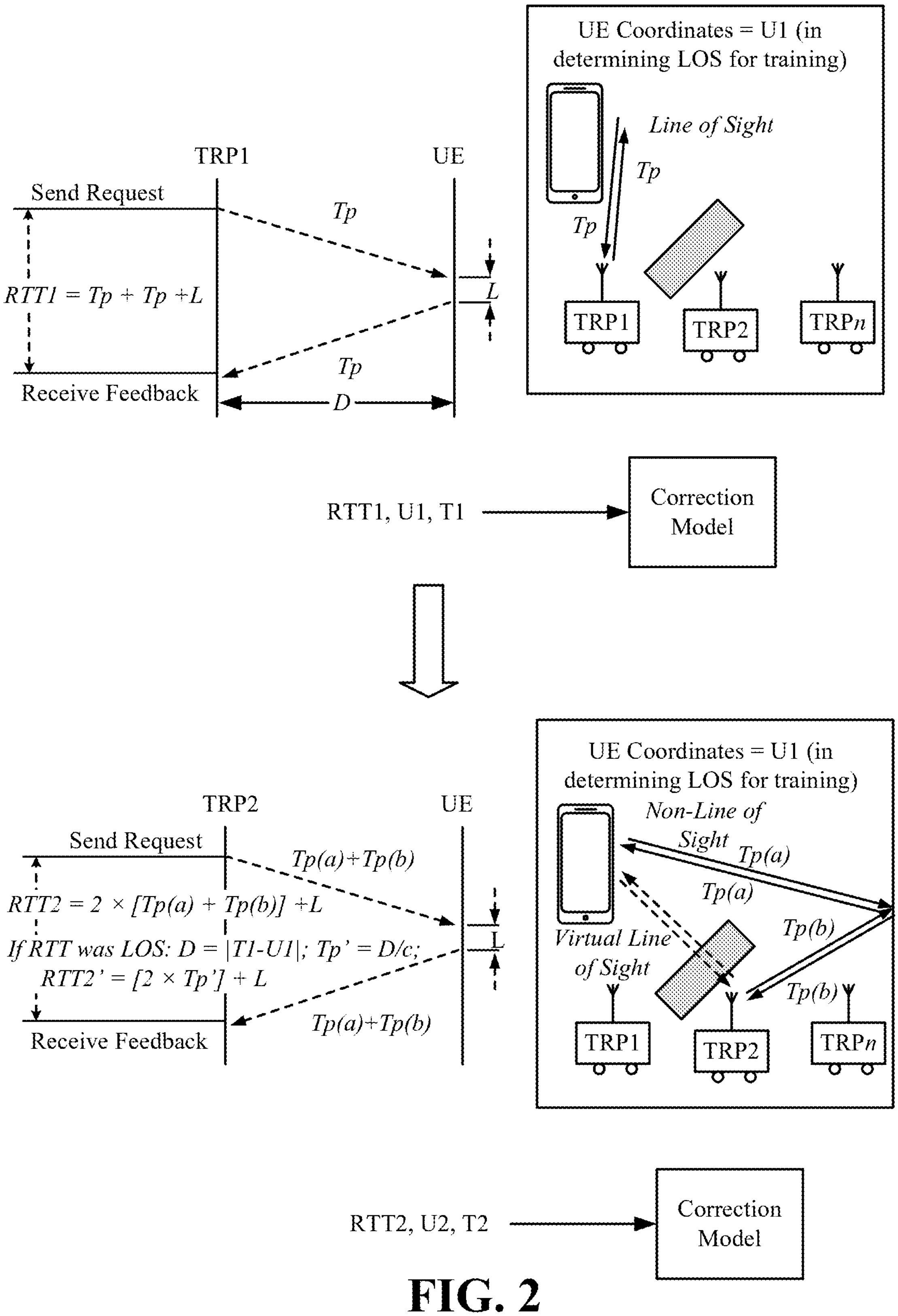
FIG. 2 shows example representations of round trip time data for line of sight and non-line of sight communication links, in accordance with various aspects and implementations of the subject disclosure.

FIG. 2 shows the concept of round trip times for line of sight communication links and non-line of sight communication links. For a line of sight communication link, as shown in the upper portion of FIG. 2, a transmit receive point (TRP) sends a request to a user equipment (UE), which is received and responded to by the UE by a transmission back to the TRP. The propagation time $T_p$ taken to transmit from the TRP1 and receive at the UE, and vice versa is based on the distance D, that is, $D=T_p \cdot c$, where c is the speed of light. There is some latency, L, at the UE between reception and the return transmission, and thus RTT1$=T_p+T_p+L$ based on $$T_p = \frac{(RTT - L)}{2}.$$

Timestamps or the like associated with each transmission can be used to determine the latency. In training, the coordinates U1 of each UE device instance (which can be a positioning reference unit such as described in the third generation partnership, or 3GPP standards) are known and used to determine the "expected" line of sight round trip time in the training data, along with the measured RTT1 value. During inference after training, the UE coordinates are unknown, and thus the measured RTT1 value associated with the TRP1 is part of the modified round trip time vector dataset used to estimate the UE coordinates.

The lower portion of FIG. 2 shows the concept of a round trip time for a non-line of sight communication link. In this example, the transmit-receive point (TRP2) sends a request to the user equipment (UE), which is received and responded to by the UE by a transmission back to the TRP2. Each total propagation time taken to transmit from the TRP1 and receive at the UE, and vice versa is based on the indirect links, shown as propagation times Tp(a) and Tp(b). Again, there is some latency, L, taken by at the UE between reception and the return transmission, and thus RTT2=2× [Tp(a)+Tp(b)]+L. In training, because the UE's coordinates U1 were known, the expected line of sight time (acting as if there was line of sight) is determined and used in the training data along with the measured RTT2 value; in inference, the UE coordinates are unknown, and thus the measured RTT2 value associated with the TRP2 is part of the round trip time vector dataset that is corrected by the trained model into virtual line of sight round trip data, with the modified vector dataset then used to estimate the UE coordinates.

Figure 3A:
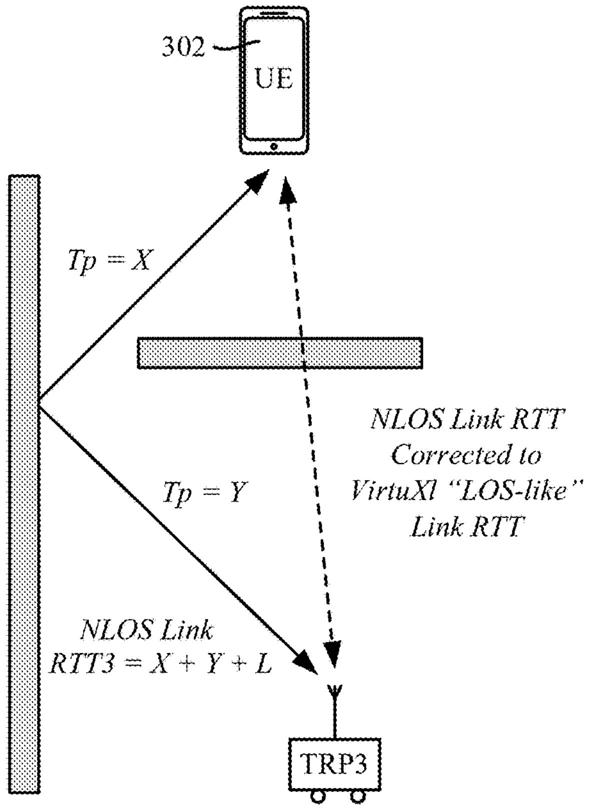
FIG. 3A shows an example representation of round trip time data for a non-line of sight communication link, and the concept of modifying the round trip time data based on a virtual line of sight communication link, in accordance with various aspects and implementations of the subject disclosure.
Figure 3B:
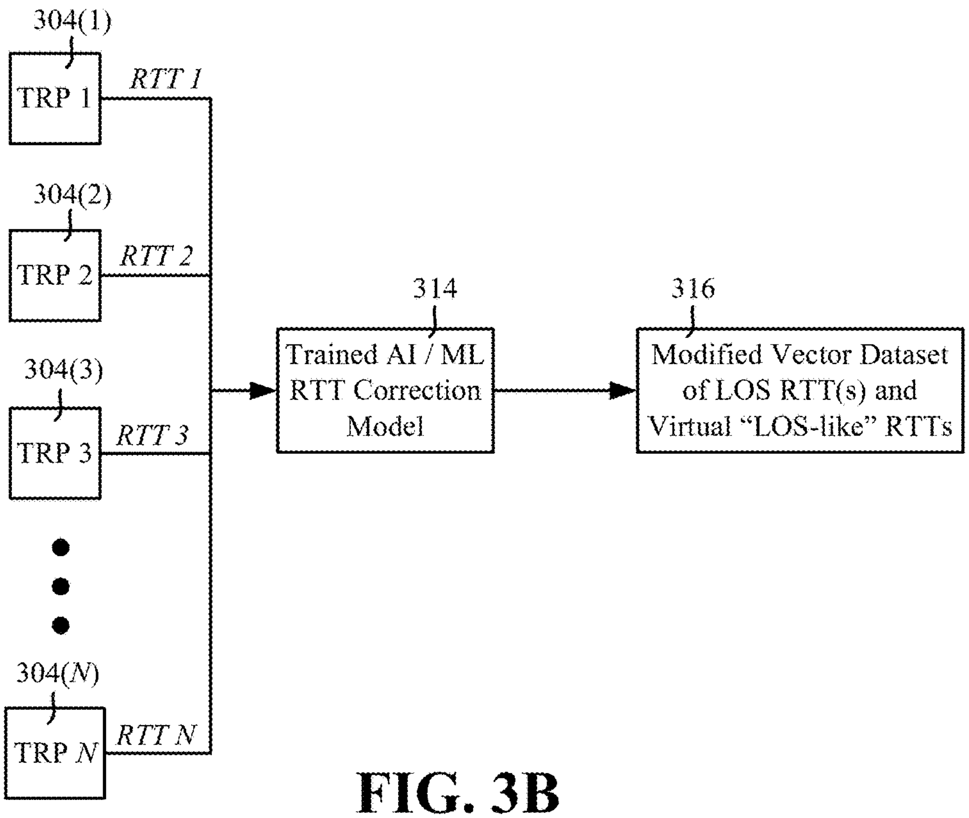
FIG. 3B shows an example representation of an AI/ML model that corrects non-line of sight round-trip time data, such as shown in FIG. 3A, to virtual line of sight round-trip time data, in accordance with various aspects and implementations of the subject disclosure.

FIG. 3A shows a similar example in which an indirect, non-line of sight round trip time of RTT3 (based on the combined distance/propagation times of X+Y (plus latency L)) between a UE 302 and a transmit-receive point TRP3 is corrected to a virtual line of sight "LOS-like" RTT. As shown in FIG. 3B, this virtual (corrected) RTT value is input to the trained AI/ML RTT correction model 314 as part of the modified vector dataset 316 that includes at least the one corrected (RTT3) value, and possibly other corrected values, and any line of sight (non-corrected) values.

It should be noted that a measured round trip time value may be inaccurate by some trivial amount for a line of sight communication link. For example, based on imperfect resolution of device or device's coordinates, timing measurements and/or latency data, even a line of sight communication link may have a round trip time that does not exactly equal the expected round trip time based on the distance between a UE and a TRP. This difference can be part of the training data for model training data. Alternatively, during training there can be some threshold difference evaluation that compares the actual measured (or simulated) round trip time versus the expected, ideal line of sight round trip time and considers the difference sufficiently close to be considered line of sight between the training device and a transmit-receive point.

Figure 4:
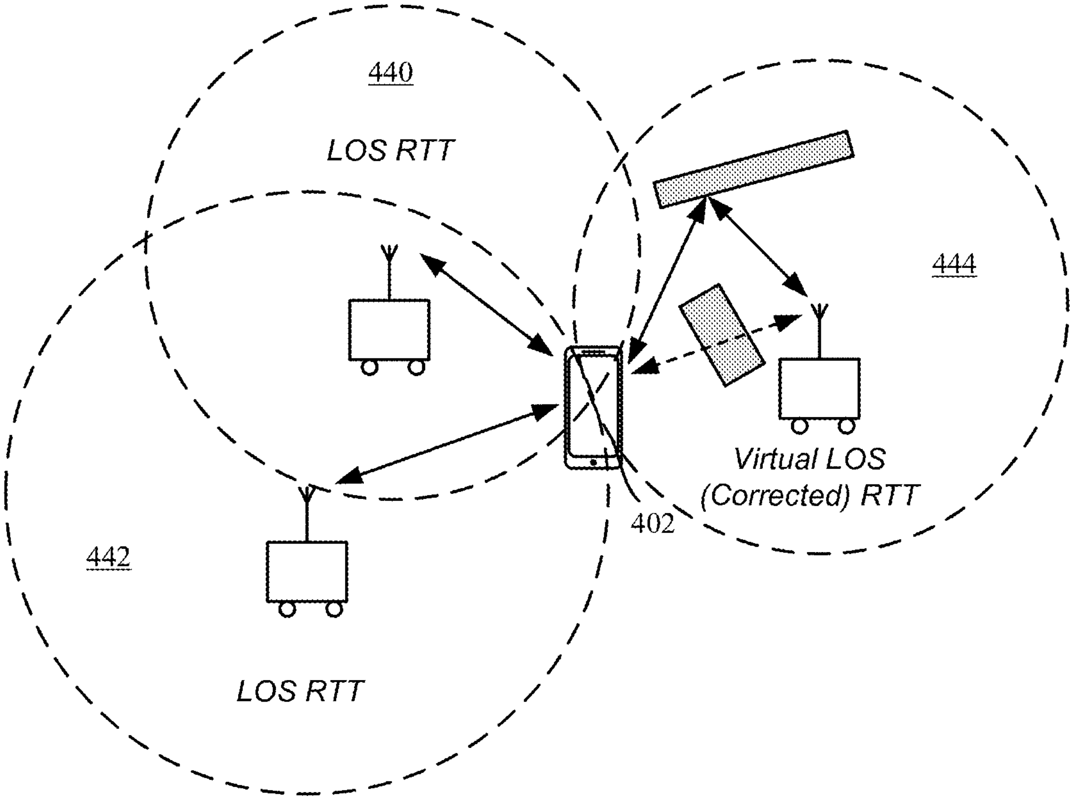
FIG. 4 is an example representation of a multiple (multi)-positioning (e.g., triangulation) scheme in which line-of sight (LOS) measured round trip time data and virtual line-of sight ("LOS-like") round trip time data are used to estimate a position of a user equipment, in accordance with various aspects and implementations of the subject disclosure.

FIG. 4 shows the multi-RTT determination (triangulation in this example) of a location of a UE 402, based on translated RTT measurements from multiple base stations/transmit-receive points (TRPs). Multi-RTT determination is based upon an assumption of line of sight conditions between TRPs and a UE, which enables interpreting measured propagation delay to a distance. Without directional information, the distance can be translated into a circle representing possible locations of a UE. With additional directional information, the circle can be reduced to an arc.

In any event, as can be seen in the example of FIG. 4, each line of sight RTT measurement represents circles 440 and 442 (or alternatively arcs) of a potential UE location, while the corrected, virtual line of sight RTT measurement represents circle 444 (or alternatively another arc). Based on their intersections, the position determination function calculates an estimate of the UE's position. Note that without the non-line of sight-based correction to a virtual line of sight distance/RTT, the circle 444 would be based on the longer non-line of sight propagation time, and thus in the wrong location (relative to the UE 402 and relative to the line of sight-based circles 440 and 442), whereby the intersection would not be at the UE's actual coordinates.

Figure 5:
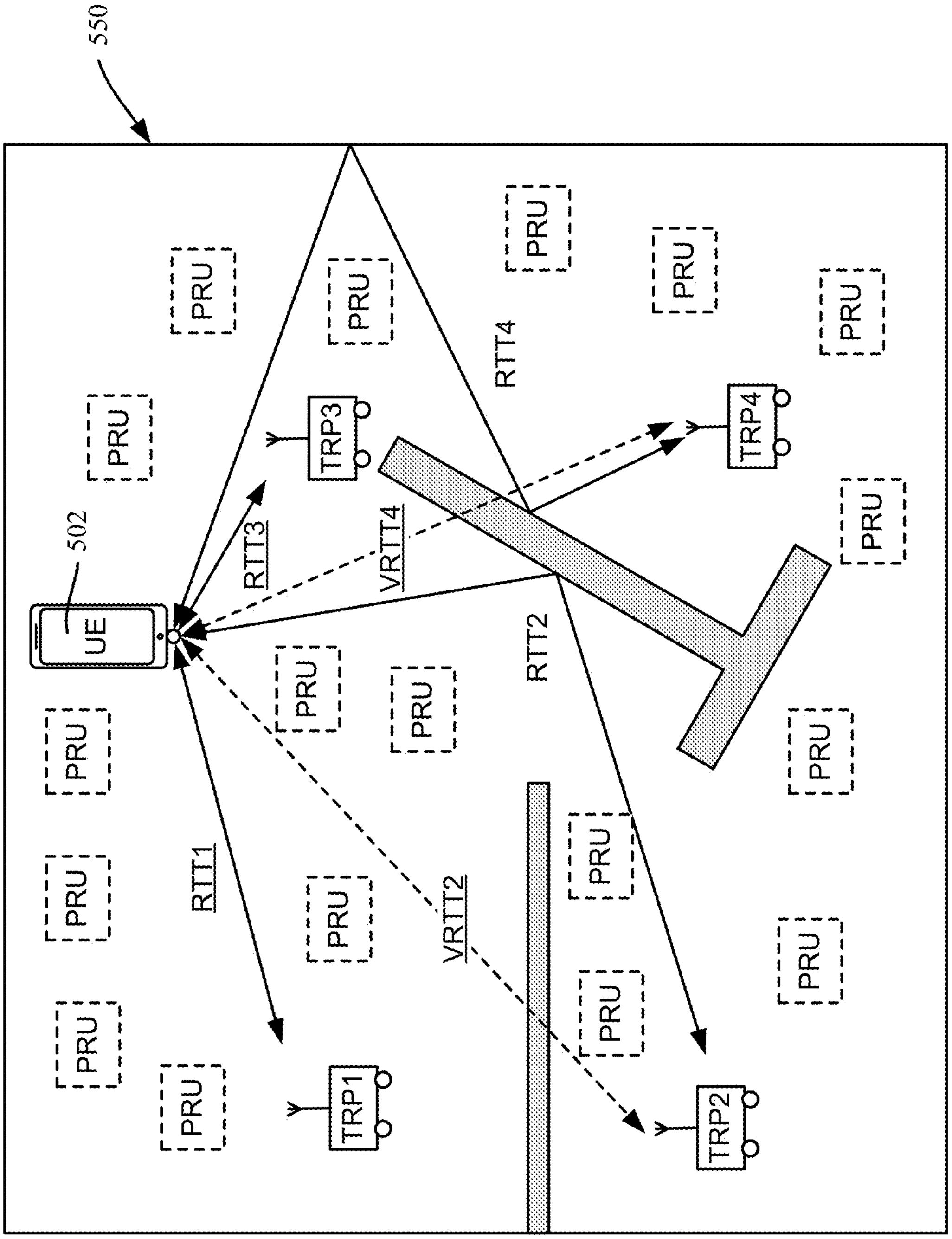
FIG. 5 is an example representation of a deployment area with round trip time model training data obtained from positioning reference unit (PRU) device instances and transmit-receive points (TRPs), and thereafter how a user equipment location can be estimated by a correction model that has been trained with the training data, in accordance with various aspects and implementations of the subject disclosure.

FIG. 5 shows an example deployment environment 550 showing four transmit-receive points (TRP1-TRP4) (simplified relative to an eighteen transmit-receive point in one 3GPP indoor scenario) that depict the AI/ML model training and/or model usage. In FIG. 4, a signal from a UE 502 is received through two LOS and two NLOS links, which unless corrected as described herein, will cause two skewed RTT measurements. Because NLOS propagation distance is significantly longer than associated LOS-like virtual links, the position estimation without NLOS RTT correction suffers significantly; in contrast with NLOS RTT correction as described herein, there is no fundamental limitation to position estimation accuracy.

As is understood, in training, positioning reference unit device instances (PRUs, represented in FIG. 5 as dashed blocks) can be positioned and/or moved throughout a deployment environment, such as a factory setting, to gather PRU location, round trip time datasets from various PRU locations relative to the TRPs. Training other than with PRUs are alternatives, as described herein. The model, not explicitly shown in the example of FIG. 5, can be located outside of or within the environment 550, and in any event is trained with such collected datasets. Note that existing deployments can be upgraded without introducing modifications to TRPs, which is valuable because their number can be significant (eighteen in the above-mentioned 3GPP positioning scenario). In usage following training, the one or more PRUs need not be active and thus typically are not present, although their presence or absence is not significant unless retraining or refinement is needed.

In this example, consider that a realistic factory floor is moderately occupied with robots, shelves and other user equipment resulting in a various levels of propagation conditions, from line of sight to non-line of sight situations. With existing line of sight-dependent algorithms, positioning accuracy of the implementation is not consistent, due to 'pockets' of non-line of sight conditions spread across the factory.

Consider that in this example, following training, a UE 502 such as a mobile internet of things (IoT) sensor or the like is within the deployment environment 550, and is located at an unknown location that needs to be determined, particularly if the UE 502 moves from time to time whereby physical measurement for this device location (and likely many such devices) is not practical. In this example, as can be seen, RTT1 and RTT3 will be obtained based on line of sight communication links, while RTT2 and RTT4 will be obtained based on non-line of sight communication links. The solid lines represent the actual communication links between the transmit receive points TRP1-TRP4 to and from the UE 502, while the dashed lines represent the model-corrected, non-line of sight communication links between the transmit receive points TRP2 and TRP4 to and from the UE 502.

As can be understood from FIG. 5, the non-line of sight propagation distances are significantly longer than the line of sight links, corresponding to longer round trip times RTT2 and RTT4 for the non-line of sight communication links relative to the shorter round trip times RTT1 and RTT3. However, because the model was trained on both line of sight and non-line of sight propagation distances corresponding to round trip times, a sufficiently accurate location of the UE can be estimated by having the model correct the non-line of sight round trip times RTT2 and RTT4 into virtual round trip times VRTT2 and VRTT4, respectively. Note that via the technology described herein, existing multi-RTT (at least three points for triangulation with two dimensions, four points with three dimensions) algorithms that rely on line of sight conditions are thus not given the two skewed RTT measurements (the non-corrected values of RTT2 and RTT4), whereby if used, the position estimation would suffer significantly. Instead, the system described herein inserts the AI/ML correction model before the multi-lateration) positioning algorithm. The measured round trip time values of RTT1 and RTT3, along with the virtual round trip time values VRTT2, and VRTT4 result in an accurate location estimation by the positioning algorithm, regardless of the various communications links' line of sight or non-line of sight conditions.

The AI/ML model captures unique properties of a planned deployment, meaning the model is trained on real measurements in the deployment environment as in FIG. 5, or based on a high-fidelity simulation of the environment. To this end, a training dataset (vectors of RTT measurements) can be generated using one or a combination of the following techniques, including using positioning reference units (PRUs)/instances thereof as in FIG. 5 spread in the deployment area at known locations to collect round trip time measurements of communications between the PRUs and the transmit-receive points. A PRU acts as a UE with a benefit of a known location, enabling to link measurements to a label. The PRUs-based dataset spatial resolution can be refined further by employing semi-supervised learning.

In outdoor scenarios, instead of (or in addition to) PRUs, one or more training device instances in the form of UEs with GPS reporting can be used, potentially enabling to collect more detailed datasets from various locations in the outdoor environment. Digital twin simulations can be used for training, where a digital twin refers to a realistic simulation of a targeted space/area, which in addition to geometric properties also simulates true-to-reality physics of materials, resulting in close-to-realistic behavior.

Different AI/ML supervised learning solutions can be considered, depending on system requirements and platform capabilities. In the event the environment changes, reinforcement learning or retraining can be employed to maintain a model's relevance over time.

Figure 6:
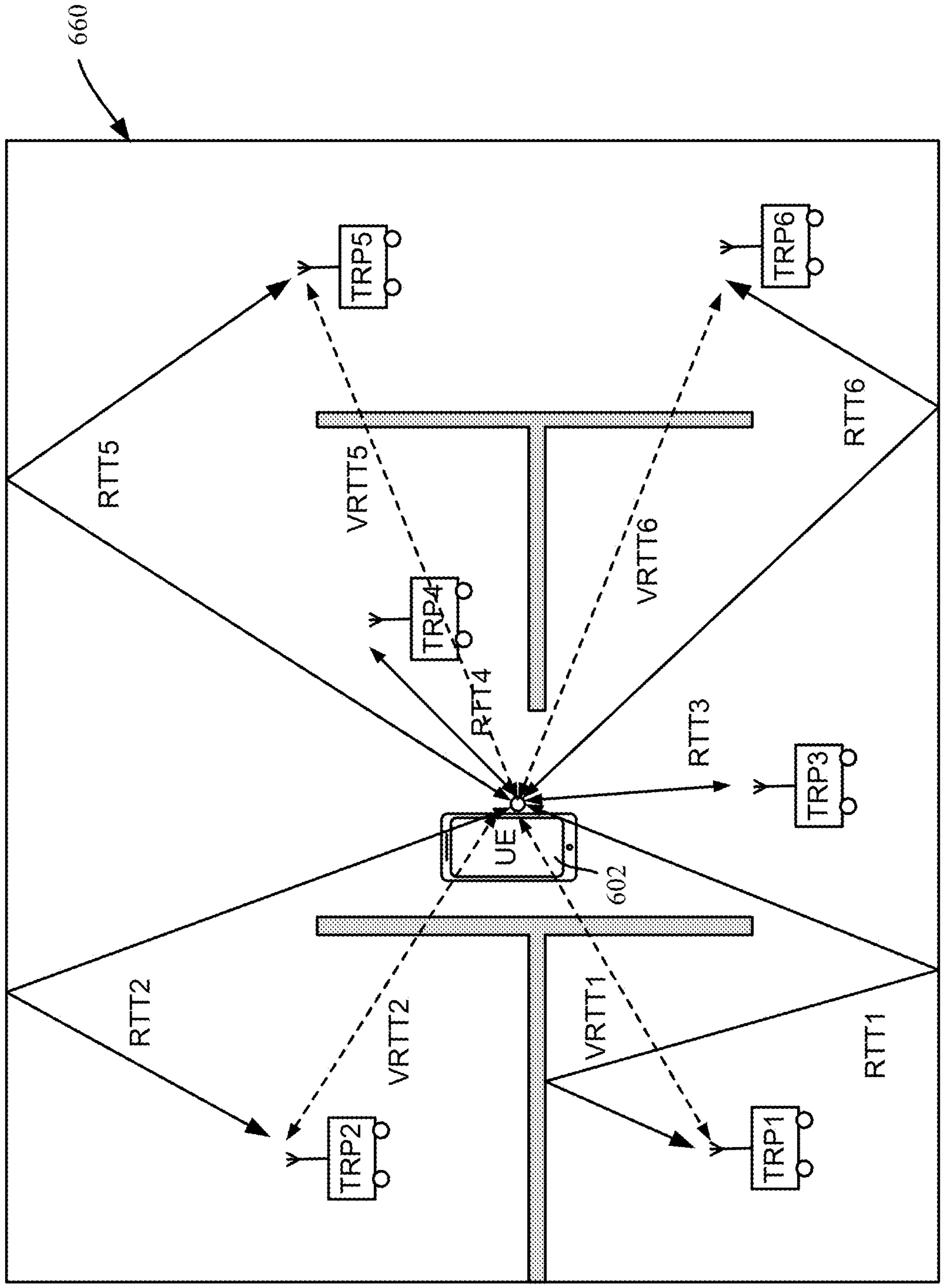
FIG. 6 is an example representation of a deployment area in which a user equipment's location can be estimated by a trained model based on line-of sight round trip time data and virtual line-of sight round trip time data obtained from measured communications between transmit-receive points and the user equipment, in accordance with various aspects and implementations of the subject disclosure.

In another example shown in FIG. 6, six transmit-receive points (TRP1-TRP6) depict AI/ML model usage with respect to estimating the location of a user equipment 602. Although not explicitly shown, it is understood that training has already occurred similar to that described herein including with reference to FIG. 5, e.g., via a number of training devices at various locations in the environment 660. As can be seen, again the non-line of sight propagation distances are significantly longer than the line of sight links, corresponding to longer round trip times RTT1, RTT2, RTT5 and RTT6 for the non-line of sight communication links relative to the shorter round trip times RTT3 and RTT4.

As is understood, the deployment scenario in scenario has six TRPs TRP1-TRP6, with only two out of six TRP-UE links being of line of sight type. Without RTT correction, line of sight-based multi-RTT algorithm accuracy would be very poor. In contrast, with a trained correction model, the position determination algorithm is able to utilize all six links without compromising on accuracy. Again, because the model was trained on both line of sight and non-line of sight propagation distances/round trip times, a sufficiently accurate location of the UE 402 can be estimated by the model by correcting non-line of sight time values RTT1, RTT2, RTT5 and RTT6 to virtual line of sight time values VRTT1, VRTT2, VRTT5 and VRTT6, respectively.

The examples of FIGS. 5 and 6 can be understood to show how an existing deployment can be upgraded to improve positioning accuracy without full overhaul of the existing solution. Considering a hypothetical network deployment in an indoor factory, resembling a known 3GPP scenario with evenly distributed TRPs and in which the implemented positioning algorithm is a multi-RTT mechanism. The factory floor can be moderately occupied with robots, shelves and other equipment resulting in a various levels of propagation conditions, from LOS to NLOS, with up to double the propagation time measured for an NLOS communication link compared to a virtual (LOS-like) communication link. Positioning accuracy of the implementation is not consistent due to the NLOS conditions spread across the factory. Although a dedicated model needs to be trained for each deployment, training with actual conditions is straightforward. Alternatively (or in addition to actual training), a dataset for initial training can be generated using a digital twin of the factory. In any scenario, the model can be refined via training using PRUs spread throughout the factory, e.g., covering more densely the NLOS conditions that tend to impact positioning error the most. The trained correction model, inserted before the multi-RTT positioning algorithm is expected to improve positioning accuracy significantly as the correction model enables multi-RTT algorithm to perform at based on complete LOS conditions.

Figure 7:
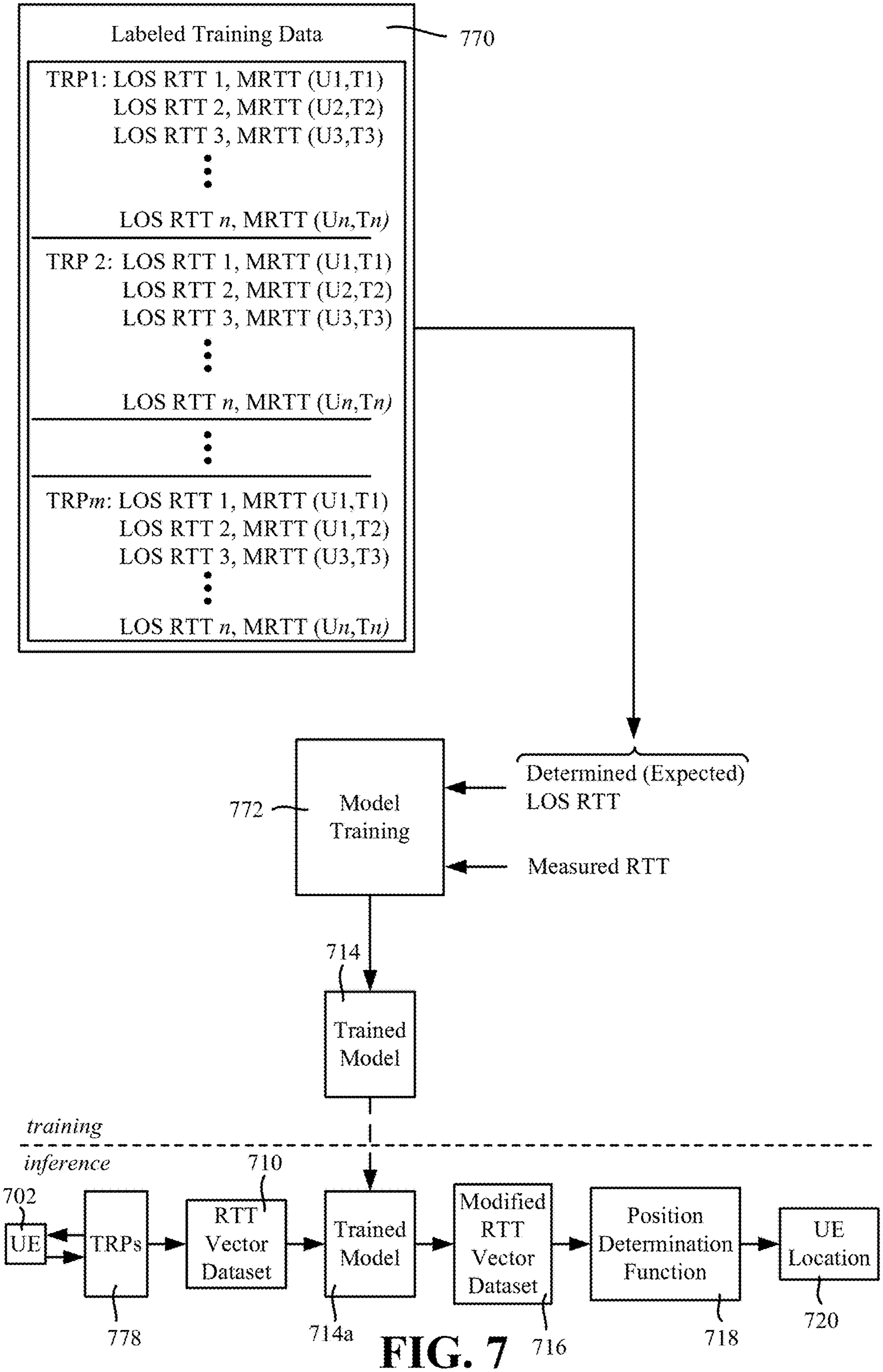
FIG. 7 is an example block diagram representation related to training a model with determined line of sight round trip time data and actual measured round trip time data, and then using the model based on measured round trip time data to estimate a location of user equipment, in accordance with various aspects and implementations of the subject disclosure.

It is understood that whether indoor-based (e.g., PRU) or UE/outdoor-based training can be performed by any number of training device instances, which can be a single training device (e.g., UE or PRU) moved among multiple known locations, and/or multiple devices at multiple known locations. FIG. 7 shows a training-related example, in which training device instances, which can be one or more positioning reference units (PRUs) and/or UEs, are located at coordinates U1-Um, and transmit-receive points communicate with the training device instances. In this example, round trip time RTT data is collected from each device instance and TRP combination, with the expected line of sight RTT determined based on their relative locations; these expected RTT, measured RTT datasets are used as the labeled training data 770 to a model training process 772, resulting in a trained model 714 that can correct non-line of sight RTT values to virtual line of sight RTT values.

In inference, a UE 702 at an unknown location communicates with a group of TRPs 778 to measure round trip time data, and the TRPs 778 in turn generate the round trip time (RTT) vector dataset 710. The RTT vector dataset 710, which includes RTT values obtained by the TRPs, is input into a working instance 714*a* of the trained model, which corrects any non-line of sight RTT values to virtual line of sight RTT values, resulting in a modified RTT vector dataset 716. The system inputs the modified RTT vector dataset 716 to the line of sight-based position determination function 718, which in turn outputs the estimated location (e.g., coordinates) 720 of the UE 702.

Figure 8:
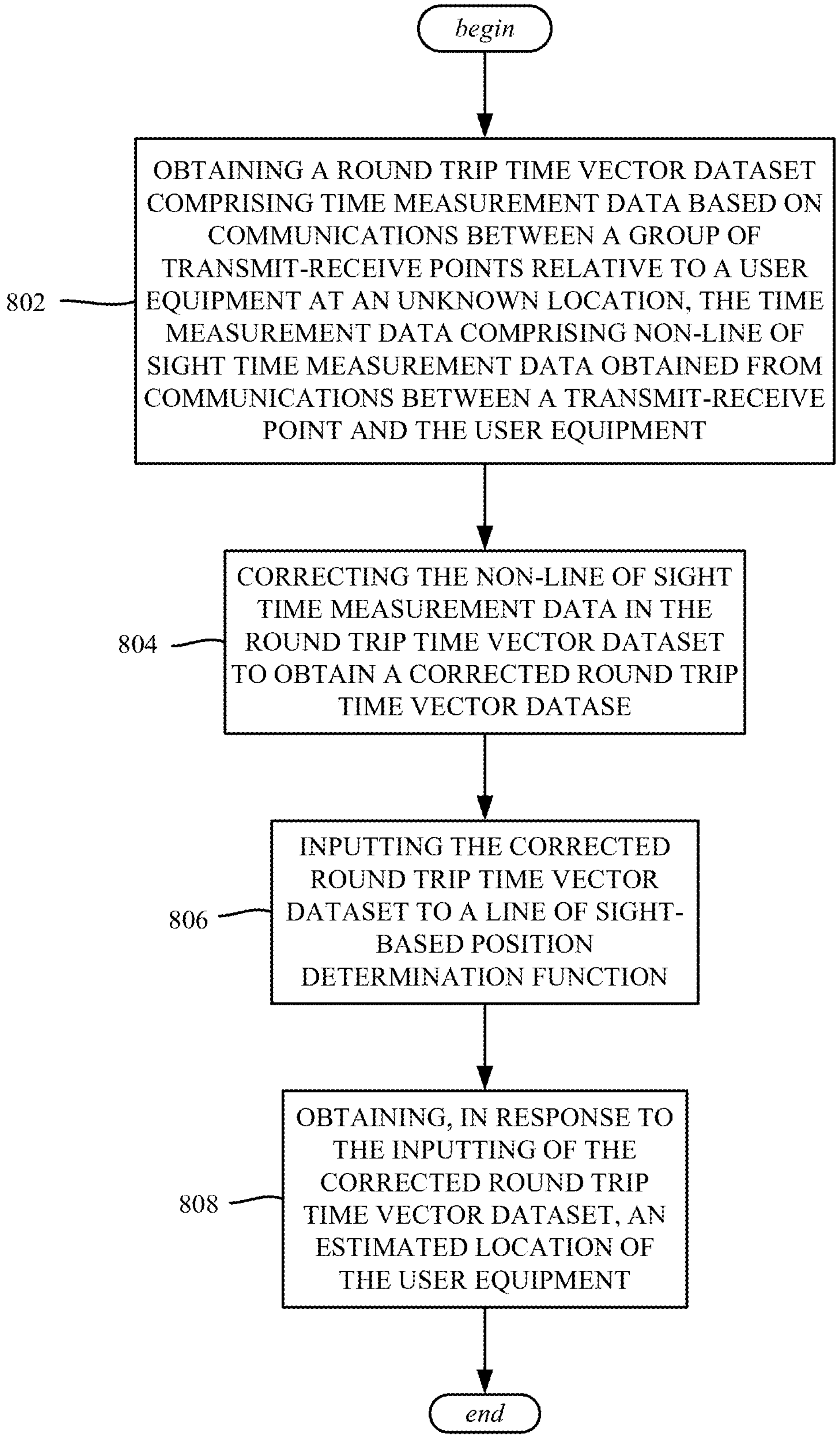
FIG. 8 is a flow diagram showing example operations related to inputting a vector dataset of round-trip times to a trained model for correcting non-line of sight time measurement data therein to obtain an estimated location of user equipment, in accordance with various aspects and implementations of the subject disclosure.

One or more aspects can be embodied in a network device, such as represented in the example operations of FIG. 8, and for example can include a memory that stores computer executable components and/or operations, and a processor that executes computer executable components and/or operations stored in the memory. Example operations can include operation 802, which represents obtaining a round trip time vector dataset comprising time measurement data based on communications between a group of transmit-receive points relative to a user equipment at an unknown location, the time measurement data comprising non-line of sight time measurement data obtained from communications between a transmit-receive point and the user equipment. Example operation 804 represents correcting the non-line of sight time measurement data in the round trip time vector dataset to obtain a corrected round trip time vector dataset. Example operation 806 represents inputting the corrected round trip time vector dataset to a line of sight-based position determination function. Example operation 808 represents obtaining, in response to the inputting of the corrected round trip time vector dataset, an estimated location of the user equipment.

The non-line of sight time measurement data obtained from the communications between the transmit-receive point and the user equipment can be obtained from first communications between a first transmit-receive point and the user equipment, and the time measurement data further can include line of sight time measurement data obtained from second communications between a second transmit-receive point and the user equipment.

Correcting the non-line of sight time measurement data into the corrected round trip time vector dataset can include inputting the time measurement data into a model trained with round-trip time training data representing round-trip times of a group of communications measured between transmit-receive points of the group of transmit-receive points and device instances at known locations. The device instances can include positioning reference units deployed at the known locations. The device instances can include at least one mobile device configured to report the known locations via global positioning system data. The transmit-receive points and the device instances at the known locations can be represented by a digital twin simulation of an environment, and the round-trip time training data can be based on the digital twin simulation.

Further operations can include refining spatial resolution of the transmit-receive points via semi-supervised learning.

The transmit-receive points of the group of transmit-receive points can be spatially distributed in a deployment environment.

The transmit-receive points of the group of transmit-receive points can be substantially evenly distributed.

Correcting the non-line of sight time measurement data into the corrected round trip time vector dataset can include inputting the time measurement data into a model trained via supervised learning with labeled training data associated with the respective transmit-receive points; the labeled training data can include respective determined line of sight round trip times based on respective locations of respective device instances, and respective measured round trip time data measured via communications between the respective transmit-receive points and the respective device instances at the respective locations.

The device instances can include at least one of: a mobile device instance moved among the second known locations, or a positioning reference unit moved among the second known locations.

Figure 9:
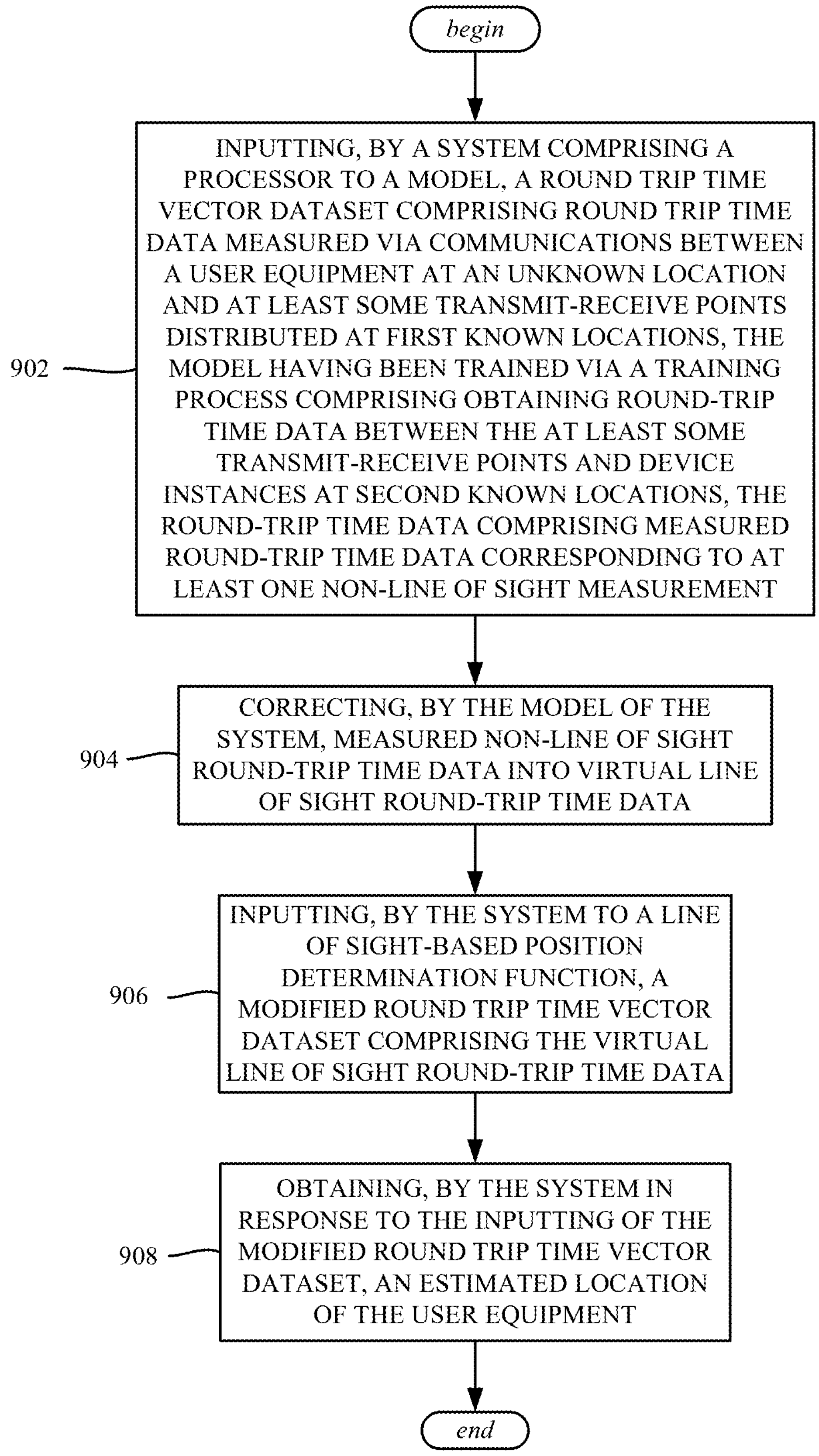
FIG. 9 is a flow diagram showing example operations related to inputting a modified round trip time vector dataset, based on correcting measured non-line of sight round-trip time data into virtual line of sight round-trip time data, for obtaining an estimated location of user equipment, in accordance with various aspects and implementations of the subject disclosure.

One or more example aspects, such as corresponding to example operations of a method, are represented in FIG. 9. Example operation 902 represents inputting, by a system comprising a processor to a model, a round trip time vector dataset comprising round trip time data measured via communications between a user equipment at an unknown location and at least some transmit-receive points distributed at first known locations, the model having been trained via a training process comprising obtaining round-trip time data between the at least some transmit-receive points and device instances at second known locations, the round-trip time data comprising measured round-trip time data corresponding to at least one non-line of sight measurement. Example operation 904 represents correcting, by the model of the system, measured non-line of sight round-trip time data into virtual line of sight round-trip time data. Example operation 906 represents inputting, by the system to a line of sight-based position determination function, a modified round trip time vector dataset comprising the virtual line of sight round-trip time data. Example operation 908 represents obtaining, by the system in response to the inputting of the modified round trip time vector dataset, an estimated location of the user equipment.

Inputting the modified round trip time vector dataset further can include inputting non-corrected line of sight round-trip time data as part of the modified round trip time vector dataset.

The training process further can include arranging non-line of sight transmit-receive points between a device of the device instances and the non-line of sight transmit-receive points more densely than line of sight transmit-receive points between the device of the device instances and the line of sight transmit-receive points.

At least one of the device instances can include a positioning reference unit, and the training process further can include moving the positioning reference unit among at least two of the second known locations.

At least one of the device instances can include a mobile device, and the training process further can include moving the mobile device among at least two of the second known locations.

The communications between the user equipment and the at least some transmit-receive points can be first communications, the round trip time data can be first round trip time data, and the training process further can include obtaining labeled training data including respective second determined round trip time data based on the second known locations, and second round trip time data of second communications, respectively, between the at least some transmit-receive points at the first known locations and the device instances at the second known locations.

Figure 10:
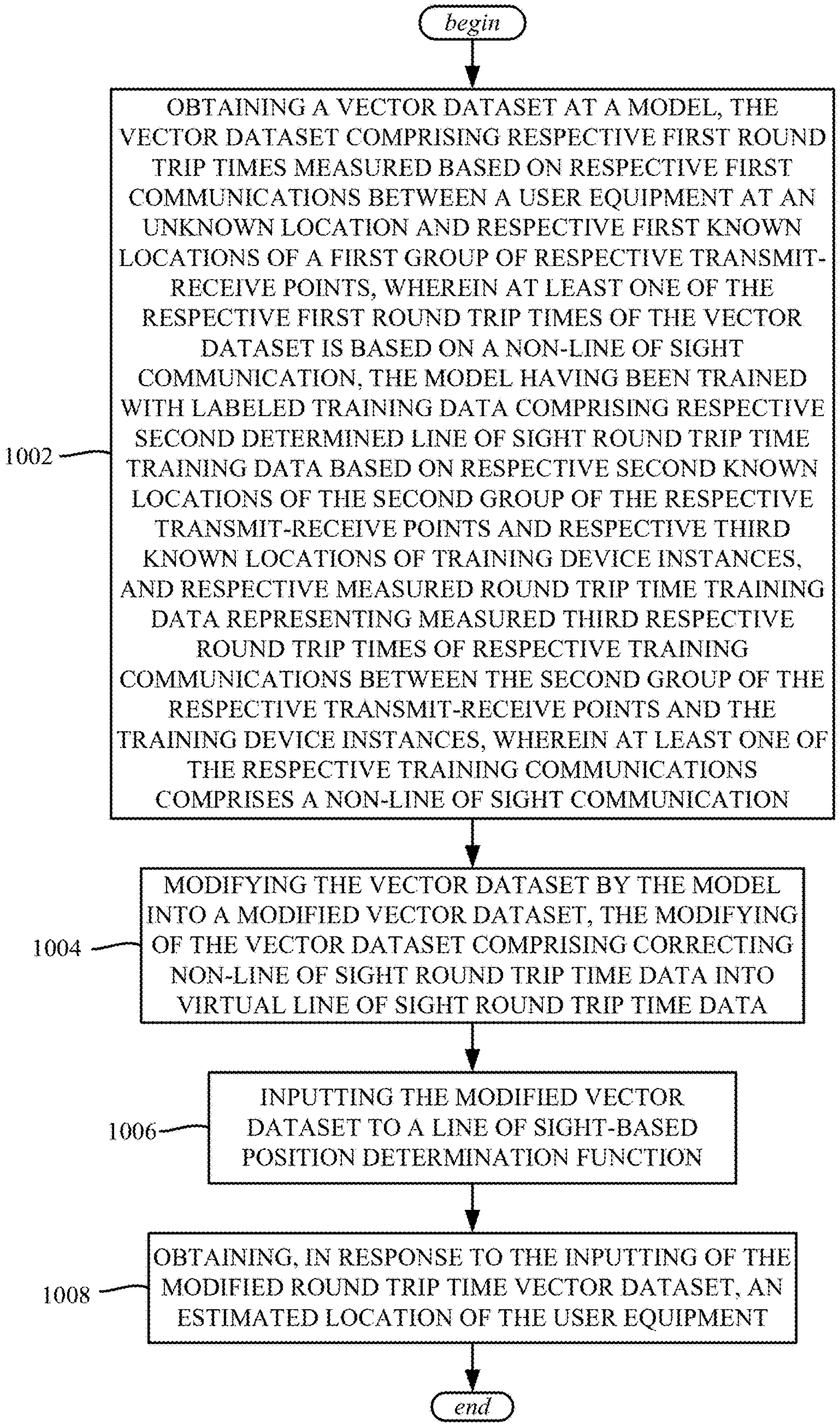
FIG. 10 is a flow diagram showing example operations related to modifying a vector dataset by a trained model into a modified vector dataset, including correcting non-line of sight round trip time data into virtual line of sight round trip time data, for obtaining an estimated location of user equipment, in accordance with various aspects and implementations of the subject disclosure.

FIG. 10 summarizes various example operations, e.g., corresponding to a machine-readable medium, including executable instructions that, when executed by a processor, facilitate performance of operations. Example operation 1002 represents obtaining a vector dataset at a model, the vector dataset comprising respective first round trip times measured based on respective first communications between a user equipment at an unknown location and respective first known locations of a first group of respective transmit-receive points, wherein at least one of the respective first round trip times of the vector dataset is based on a non-line of sight communication, the model having been trained with labeled training data comprising respective second determined line of sight round trip time training data based on respective second known locations of the second group of the respective transmit-receive points and respective third known locations of training device instances, and respective measured round trip time training data representing measured third respective round trip times of respective training communications between the second group of the respective transmit-receive points and the training device instances, wherein at least one of the respective training communications comprises a non-line of sight communication. Example operation 1004 represents modifying the vector dataset by the model into a modified vector dataset, the modifying of the vector dataset comprising correcting non-line of sight round trip time data into virtual line of sight round trip time data. Example operation 1006 represents inputting the modified vector dataset to a line of sight-based position determination function. Example operation 1008 represents obtaining, in response to the inputting of the modified round trip time vector dataset, an estimated location of the user equipment.

As can be seen, the technology described herein exploits relations between measured RTT values, including with line of sight and non-line of sight conditions, to derive a UE's position using corrected round trip time values for non-line of sight conditions. This is done without tight network synchronization requirements, that is, without the drawbacks of channel impulse response timing considerations (input variations and tight network synchronization requirements, although channel impulse response is not precluded from use as well), and without the drawbacks of only true line of sight conditions/requirements of existing multi-RTT algorithms. No modification is needed for TRPs, which can be deployed at various practical locations.

An AI/ML model as described herein is less sensitive than existing direct AI/ML based approaches because of not being dependent on clock behavior, and can be trained and used with a reduced set of input data relative to channel impulse response data. In addition, although deployment-specific, the reduced training input dimensions (training device coordinates, TRP coordinates and round trip time data) make it far more feasible to train the AI/ML correction model over a large number of expected scenarios, including in noisy RTT measurements, than could be practically done using the vast number of possible variations that can impact perceived channel impulse response data. The AI/ML correction model as described herein thus has reduced complexity relative to channel impulse response-based model. Still further, in usage of the model, there is reduced overhead of reporting from the TRPs to the AI/M-based location management function, that is, only RTT measurements and TRP location data (which can be previously known from a TRP ID or the like) from the TRPs are part of the vector, instead of the full channel impulse response data.

Figure 11:
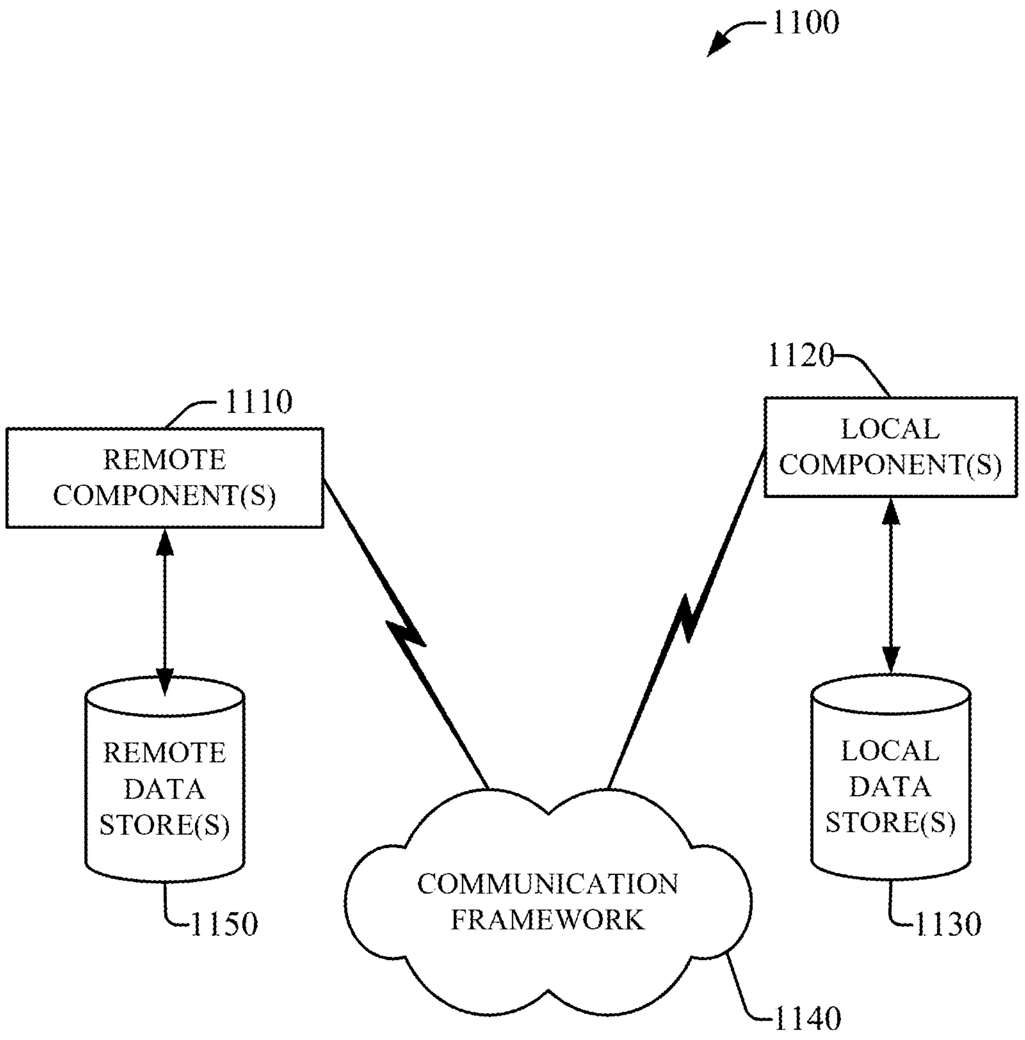
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
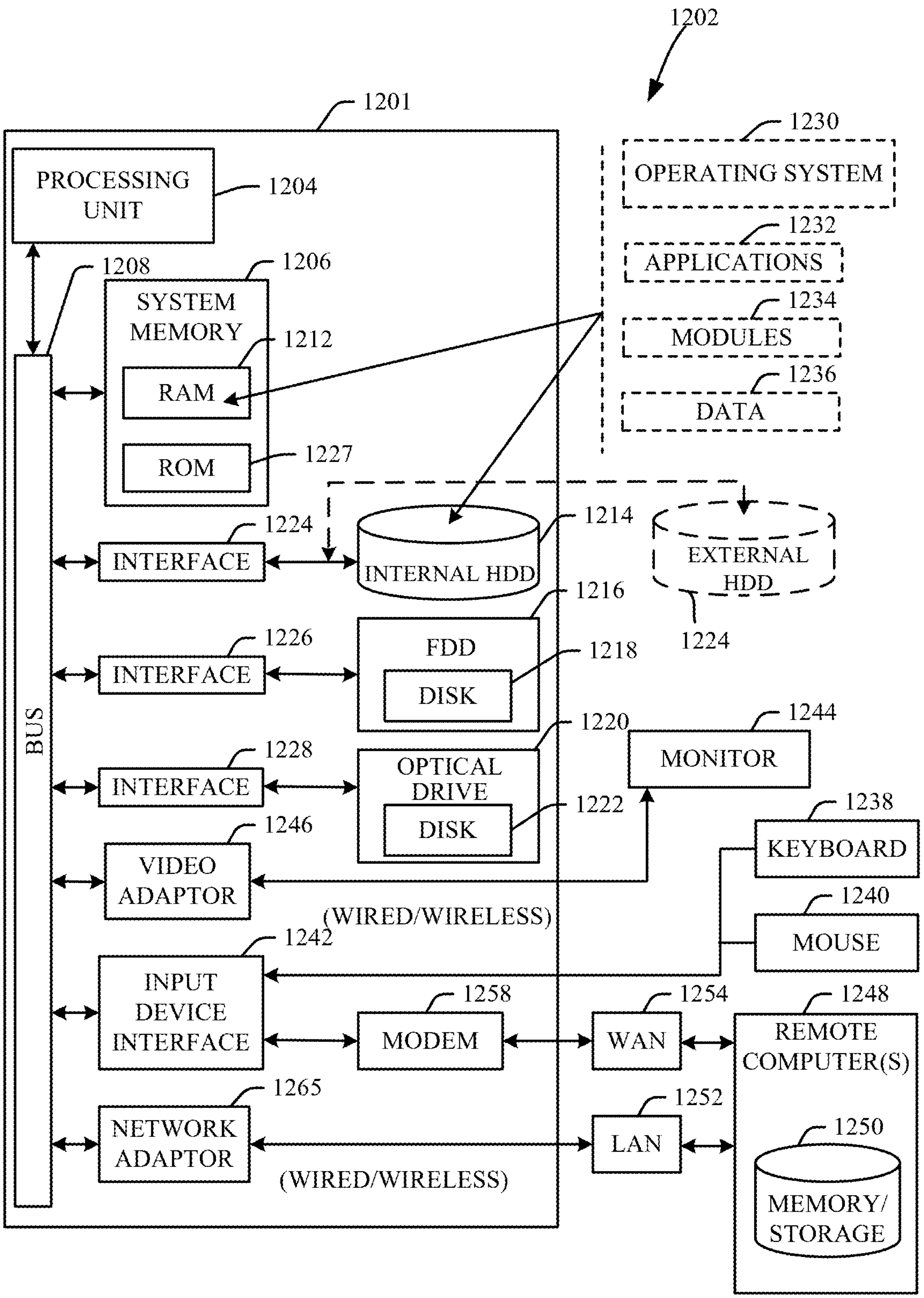
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining a dataset comprising round trip time vectors of time measurement data based on communications between a group of transmit-receive points relative to a user equipment at an unknown location, the time measurement data comprising measured non-line of sight round trip times obtained from communications between a transmit-receive point and the user equipment;

correcting the non-line of sight round trip times in the round trip time vector dataset to obtain a corrected round trip time vector dataset comprising expected line of sight time round trip times corresponding to the measured non-line of sight round trip times, wherein the correcting comprises adjusting each measured non-line of sight round trip time of the measured non-line of sight round trip times based on a respective time difference output by a trained round trip time (RTT) correction machine learning model, the respective time difference corresponding to a difference between the measured non-line of sight round trip time and an expected line of sight round trip time for the measured non-line of sight round trip time, wherein the trained RTT correction machine learning model receives, as input, a vector consisting of the round trip time vector dataset and location data of the group of transmit-receive points, without channel impulse response data or channel estimation data of the communications between the group of transmit-receive points and the user equipment;

inputting the corrected round trip time vector dataset comprising the expected line of sight round-trip times to a line of sight-based position determination function; and obtaining, in response to the inputting of the corrected round trip time vector dataset, an estimated location of the user equipment.

2. The system of claim 1, wherein the measured non-line of sight round trip times obtained from the communications between the transmit-receive point and the user equipment is obtained from first communications between a first transmit-receive point and the user equipment, and wherein the time measurement data further comprises line of sight time measurement data obtained from second communications between a second transmit-receive point and the user equipment.

3. The system of claim 1, wherein the correcting of the non-line of sight round trip times further comprises inputting the time measurement data into the trained RTT correction machine learning model that has been previously trained with round-trip time training data representing round-trip times of a group of communications measured between transmit-receive points of the group of transmit-receive points and device instances at known locations.

4. The system of claim 3, wherein the device instances comprise positioning reference units deployed at the known locations.

5. The system of claim 3, wherein the device instances comprise at least one mobile device configured to report the known locations via global positioning system data.

6. The system of claim 3, wherein the transmit-receive points and the device instances at the known locations are represented by a digital twin simulation of an environment, and wherein the round-trip time training data is based on the digital twin simulation.

7. The system of claim 3, wherein the operations further comprise refining spatial resolution of the transmit-receive points via semi-supervised learning.

8. The system of claim 1, wherein the transmit-receive points of the group of transmit-receive points are spatially distributed in a deployment environment.

9. The system of claim 8, wherein the transmit-receive points of the group of transmit-receive points are substantially evenly distributed.

10. The system of claim 1, wherein the correcting of the non-line of sight round trip times further comprises inputting the time measurement data into the trained RTT correction machine learning model that has been previously trained via supervised learning with labeled training data associated with the respective transmit-receive points, the labeled training data comprising respective determined line of sight round trip times based on respective locations of respective device instances, and respective measured round trip time data measured via communications between the respective transmit-receive points and the respective device instances at the respective locations.

11. The system of claim 10, wherein the device instances comprise at least one of: a mobile device instance moved among the second known locations, or a positioning reference unit moved among the second known locations.

12. A method, comprising:

inputting, by a system comprising at least one processor to a trained round trip time (RTT) correction machine learning model, a dataset comprising round trip time vectors of round trip time data measured via communications between a user equipment at an unknown location and at least some transmit-receive points distributed at first known locations, the trained RT correction machine learning model having been trained via a training process using training round-trip time data between the at least some transmit-receive points and device instances at second known locations, the round-trip time data comprising measured non-line of sight round-trip times corresponding to non-line of sight measurements of at least a portion of the communications;

correcting, by the trained RTT correction machine learning model of the system, the measured non-line of sight round-trip times into expected line of sight round-trip times corresponding to the measured non-line of sight round trip times, wherein the correcting comprises adjusting each measured non-line of sight round trip time of the measured non-line of sight round trip times based on a respective time difference output by the trained RTT correction machine learning model, the respective time difference corresponding to a difference between the measured non-line of sight round trip time and an expected line of sight round trip time for the measured non-line of sight round trip time, wherein the trained RTT correction machine learning model receives, as input, a vector consisting of the round trip time vector dataset and location data of the group of transmit-receive points, without channel impulse response data or channel estimation data of the communications between the group of transmit-receive points and the user equipment;

inputting, by the system to a line of sight-based position determination function, a modified round trip time vector dataset comprising the expected line of sight round-trip times; and obtaining, by the system in response to the inputting of the modified round trip time vector dataset, an estimated location of the user equipment.

13. The method of claim 12, wherein the inputting of the modified round trip time vector dataset further comprises inputting non-corrected line of sight round-trip time data as part of the modified round trip time vector dataset.

14. The method of claim 12, wherein the training process further comprises arranging non-line of sight transmit-receive points between a device of the device instances and the non-line of sight transmit-receive points more densely than line of sight transmit-receive points between the device of the device instances and the line of sight transmit-receive points.

15. The method of claim 12, wherein at least one of the device instances comprises a positioning reference unit, and wherein the training process further comprises moving the positioning reference unit among at least two of the second known locations.

16. The method of claim 12, wherein at least one of the device instances comprises a mobile device, and wherein the training process further comprises moving the mobile device among at least two of the second known locations.

17. The method of claim 12, wherein the communications between the user equipment and the at least some transmit-receive points are first communications, wherein the round trip time data is first measured round trip time data, and wherein the training process further comprises obtaining labeled training data comprising respective determined round trip time data based on the second known locations, and second measured round trip time data of second communications, respectively, between the at least some transmit-receive points at the first known locations and the device instances at the second known locations.

18. A non-transitory machine-readable medium, comprising executable instructions that, when executed by at least one processor, facilitate performance of operations, the operations comprising:

obtaining a vector dataset at a trained round trip time (RTT) correction machine learning model, the vector dataset comprising respective first round trip times measured based on respective first communications between a user equipment at an unknown location and respective first known locations of a first group of respective transmit-receive points, wherein the first round trip times comprise at least one non-line of sight round trip time, the trained RTT correction machine learning model having been trained with labeled training data comprising respective second determined line of sight round trip time training data based on respective second known locations of the second group of the respective transmit-receive points and respective third known locations of training device instances, and respective measured round trip time training data representing measured third respective round trip times of respective training communications between the second group of the respective transmit-receive points and the training device instances, wherein at least one of the respective training communications comprises a non-line of sight communication;

modifying the vector dataset by the model into a modified vector dataset, the modifying of the vector dataset comprising correcting the at least one non-line of sight round trip time into at least one respective expected line of sight round trip time, wherein the correcting comprises adjusting each non-line of sight round trip time of the at least one non-line of sight round trip time based on a respective time difference output by the trained RTT correction machine learning model, the respective time difference corresponding to a difference between the non-line of sight round trip time and an expected line of sight round trip time for the non-line of sight round trip time, wherein the trained RTT correction machine learning model receives, as input, a vector consisting of the round trip time vector dataset and location data of the group of transmit-receive points, without channel impulse response data or channel estimation data of the communications between the group of transmit-receive points and the user equipment;

inputting the modified vector dataset comprising the at least one respective expected line of sight round trip time to a line of sight-based position determination function; and obtaining, in response to the inputting of the modified round trip time vector dataset, an estimated location of the user equipment.

19. The non-transitory machine-readable medium of claim 18, wherein the respective first known locations comprise the respective second known locations.

20. The non-transitory machine-readable medium of claim 18, wherein the respective device instances at the third known locations comprise at least one of: a positioning reference unit, or a mobile device.

* * * * *